United States Patent [19]

Kodama et al.

[11] Patent Number: 5,414,465
[45] Date of Patent: May 9, 1995

[54] LUMINANCE SIGNAL GENERATOR WITH INTERPOLATION

[75] Inventors: Yasumasa Kodama; Yoshiyuki Sekine, both of Kanagawa, Japan

[73] Assignee: Sony Corporation, Japan

[21] Appl. No.: 176,463

[22] Filed: Jan. 3, 1994

[30] Foreign Application Priority Data

Jan. 14, 1993 [JP] Japan .................................. 5-004939

[51] Int. Cl.6 .............................................. H04N 9/09
[52] U.S. Cl. ...................................... 348/236; 348/264
[58] Field of Search ............... 348/222, 234, 235, 236, 348/659, 262, 264, 272, 265, 276, 277; H04N 9/67, 9/68, 9/09, 9/07

[56] References Cited

U.S. PATENT DOCUMENTS

| 3,975,760 | 8/1976 | Yamanaka et al. | 358/41 |
| 5,184,212 | 2/1993 | Yamamoto et al. | 348/265 |
| 5,337,152 | 8/1994 | Kotaki | 348/234 |

FOREIGN PATENT DOCUMENTS 2128591 5/1990 Japan .............. H04N 9/67
9013977 11/1990 WIPO ............... H04N 9/67

Primary Examiner—James J. Groody
Assistant Examiner—Jeffrey S. Murrell
Attorney, Agent, or Firm—Ronald P. Kananen

[57] ABSTRACT

A luminance signal generating apparatus including a first CCD device, and a second CCD device disposed at a position obliquely displaced relative to a spatial position of the first CCD device, an interpolating circuit for interpolating an output from the second CCD device. A low band luminance signal generating circuit generates a low band luminance signal on the basis of an output from the interpolating circuit. A high band luminance signal generating circuit generates a high band luminance signal on the basis of output signals from the first and second CCD devices and the interpolation signal from the interpolating circuit. A luminance signal generating circuit generates a luminance signal on the basis of the low band luminance signal and the high band luminance signal from the low band luminance signal generating circuit and the high band luminance generating circuit.

7 Claims, 5 Drawing Sheets

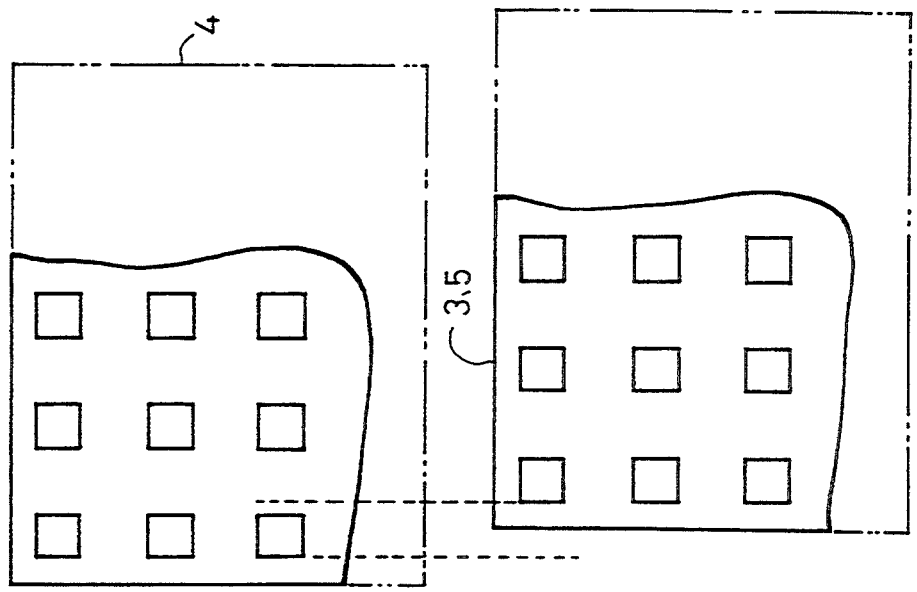
FIG. 2B
FIG. 2C
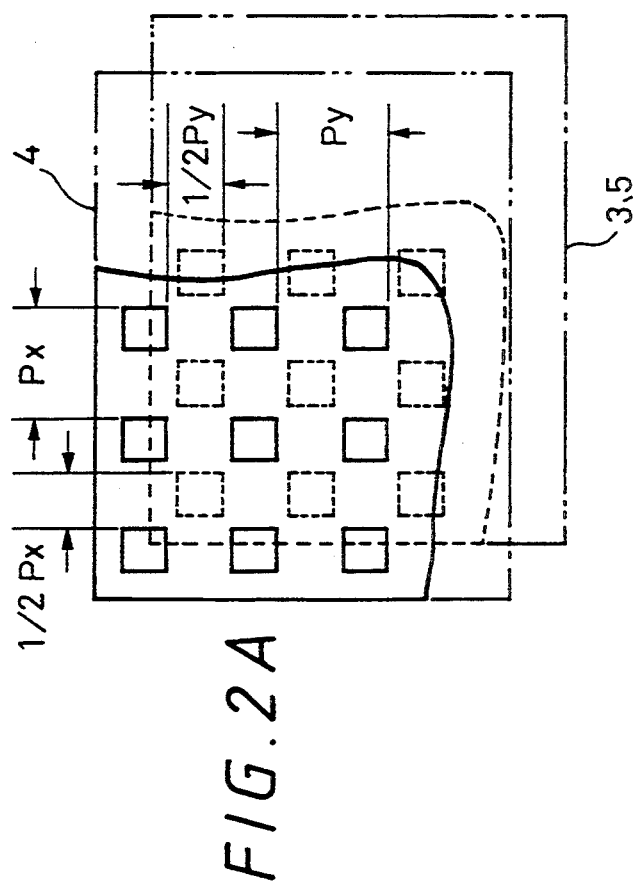
FIG. 2A

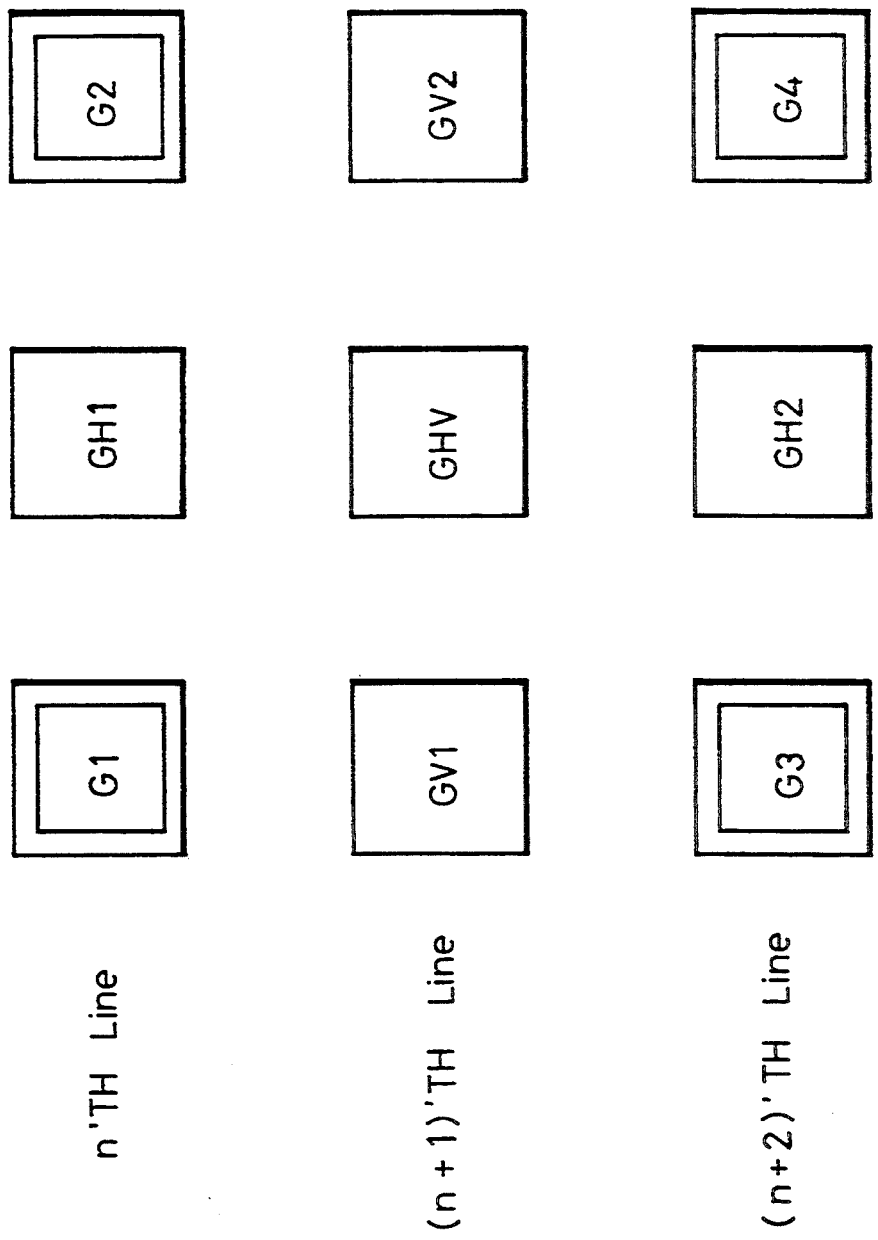

LUMINANCE SIGNAL GENERATOR WITH INTERPOLATION

BACKGROUND OF THE INVENTION

1. Field of the Invention

The present invention relates to a luminance signal. generating apparatus for use with a two-chip or 3-chip type video camera which obtains a color video signal by picking up an object by using a plurality of CCD (charge-coupled device) devices or the like, for example.

2. Description of the Prior Art

Heretofore, there have been widely used video cameras which derive a video signal by picking up an object by using one or a plurality of CCD devices regardless of consumer video cameras or professional video cameras.

In a video camera of 3-chip type (using three CCD devices), in particular, a light from an object is separated by a color separation prism into lights of red (R), green (G) and blue (B) components. The red, green and blue component lights thus obtained are respectively photoelectrically-converted into video signals (primary color signals) by three CCD devices, and a luminance signal and color difference signals R−Y and B−Y are obtained by effecting a variety of signal processings on the three video signals. Then, when these signals are output in the form of a composite or component video signal, there can be obtained a video signal whose reproducibility is higher than that of a video camera using one or two CCD devices.

A resolution of the 3-chip type video camera is the same as that of the video camera using one or two CCD devices. Therefore, in order to obtain a high resolution of a high definition television as expected in post-television, i.e., hi-vision, a resolution higher than a standard resolution of the NTSC system, the following two methods must be taken.

One method is to increase the number of pixels per unit area and the other method is to increase the area of CCD device with to thereby form the CCD device a number of pixels.

The above-mentioned method that increases the number of pixels per unit area needs an ultra-microlithography technology that is very difficult, and a yield is deteriorated considerably.

Further, according to the method in which the CCD device is formed with a number of pixels by increasing the area of the CCD device, a yield is deteriorated, and a power consumption is increased. Furthermore, when a video camera is designed so as to mount such large CCD devices, a resultant video camera becomes large in size and heavy, contrary to the goal that the video camera be miniaturized and reduced in weight.

In addition, in accordance with the increase of pixels by the above-mentioned two methods, a horizontal transfer efficiency is deteriorated, and the power consumption is increased with the increase of a transfer speed.

OBJECTS AND SUMMARY OF THE INVENTION

Therefore, it is an object of the present invention to provide an improved luminance signal generating apparatus in which the aforesaid shortcomings and disadvantages encountered with the prior art can be eliminated.

More specifically, it is an object of the present invention to provide a luminance signal generating apparatus in which a video camera can be miniaturized and reduced in weight.

It is another object of the present invention to provide a luminance signal generating apparatus in which a video signal having a resolution at least twice the conventional resolution can be obtained by using a CCD device of at least the same number of pixels without increasing the physical number of pixels.

According to a first aspect of the present invention, there is provided a luminance signal generating apparatus which comprises a first CCD device, a second CCD device disposed at a position obliquely displaced relative to a spatial position of the first CCD device, an interpolating circuit for interpolating an output from the second CCD device, a low band luminance signal generating circuit for generating a low band luminance signal on the basis of an output from the interpolating circuit, a high band luminance signal generating circuit for generating a high band luminance signal on the basis of output signals from the first and second CCD devices and the interpolation signal from the interpolating circuit, and a luminance signal generating circuit for generating a luminance signal on the basis of the low band luminance signal and the high band luminance signal from the low band luminance signal generating circuit and the high band luminance generating circuit.

In accordance with a second aspect of the present invention, there is provided a luminance signal generating apparatus which comprises first and second CCD devices, a third CCD device disposed at a position displaced by a ½ pixel in the horizontal and vertical directions relative to spatial positions of the first and second CCD devices, an interpolating circuit for interpolating an output signal from the third CCD device, a low band luminance signal generating circuit for generating a low band luminance signal on the basis of an output signal from the interpolating circuit, a high band luminance signal generating circuit for generating a high band luminance signal on the basis of output signals from the second and third CCD devices and the interpolation signal from the interpolating circuit, and a luminance signal generating circuit for generating a luminance signal on the basis of the low band luminance signal and the high band luminance signal from the low band luminance signal generating circuit and the high band luminance signal generating circuit.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 2A, 2B and 2C are respectively schematic diagrams used to explain the embodiment of the luminance signal generating apparatus according to the present invention;

FIG. 3 is a schematic diagram used to explain an interpolation processing used in the present invention;

DETAILED DESCRIPTION OF THE PREFERRED EMBODIMENT

A video camera to which an embodiment of a luminance signal generating apparatus according to the present invention is applied will be described with reference to FIG. 1 of the accompanying drawings.

Figure 1:
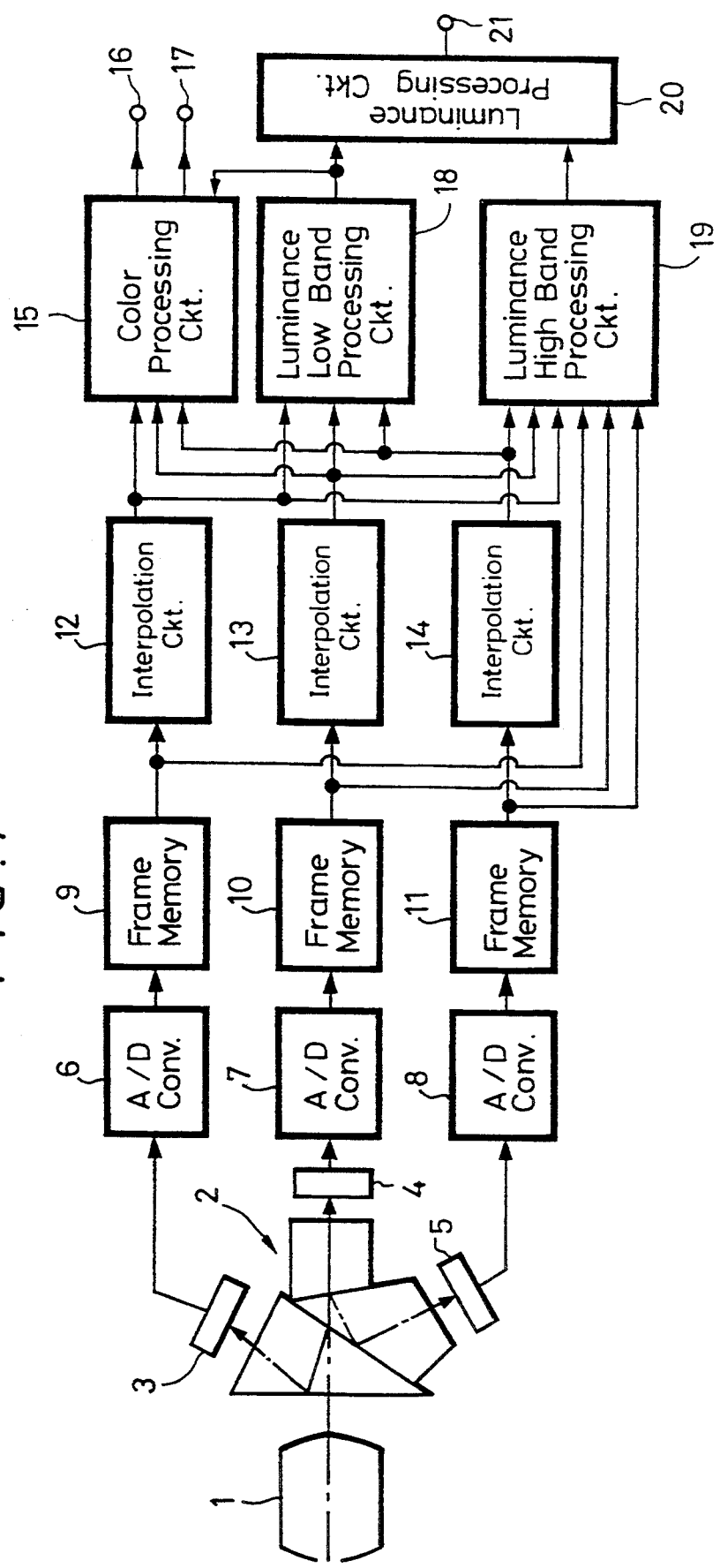
FIG. 1 is a schematic block diagram showing a luminance signal generating apparatus according to an embodiment of the present invention.

Referring to FIG. 1, there is provided an optical system which converges lights from an object (not shown). A light of object converged by this optical system 1 is introduced into a color separation prism 2. The light incident on this color separation prism 2, i.e., red (R), green (G) and blue (B) components thereof are respectively separated by this color separation prism 2, repeatedly reflected and passed as shown by one-dot chain line arrows in FIG. 1, and then introduced into a CCD device 3 (for red component), a CCD device 4 (for green component) and a CCD device 5 (for blue component), respectively.

The red component light (R), the green component light (G) and the blue component light (B) that were respectively introduced into these CCD devices 3, 4 and 5 are photoelectrically-converted by the CCD devices 3, 4, 5, then output as video signals (primary color signals) in response to a variety of pulses supplied from a transfer pulse generator circuit (not shown) or the like, and respectively supplied to A/D (analog-to-digital) converters 6, 7 and 8. These analog video signals are converted by the A/D converters 6, 7, 8 into digital video signals and then supplied to frame memories 9, 10, 11, respectively. The digital video signals supplied to these frame memories 9, 10 and 11 are stored therein at the frame unit in response to a write signal supplied thereto from a write/read circuit (not shown) or the like. Incidentally, the frame memories 9, 10 and 11 are adapted to match a timing in circuit processing and therefore the frame memories 9, 10 and 11 might be replaced with devices or elements that can achieve such object.

The CCD devices 3, 4 and 5 are disposed as follows. That is, as shown in FIG. 2A, Px assumes a pitch of a lateral direction of each pixel (shown by a small square in FIG. 2A) and Py assumes a pitch of a vertical direction thereof. Then, the red, blue and green CCD devices 3, 4, 5 are disposed such that the pitch of the red and blue CCD devices 3, 5 are disposed with displacements of pitches of ½Px in the lateral direction and ½Py in the vertical direction relative to the spatial position of the green CCD device 4, i.e., the red and blue CCD devices 3, 5 are disposed at the positions obliquely displaced from the spatial position of the green CCD device 4 (see FIGS. 2B, 2C).

Referring back to FIG. 1, the digital video signals that were temporarily stored in the frame memories 9, 10, 11 are read out therefrom in response to a read signal supplied thereto from the write/read circuit (not shown) or the like and then respectively supplied to a luminance high band processing circuit 19 and interpolating circuits 12, 13, 14 which will be described later on.

The interpolating circuits 12, 13, 14 effect the interpolation processing on the digital video signals read out from the frame memories 9, 10, 11 as follows.

When squares shown by a double frame represent original signals and other squares represent interpolation signals (i.e., upper, lower, right, left and oblique points of the original signal) in FIG. 3, an interpolation signal GH1 is obtained by averaging original signals G1 and G2; an interpolation signal GV1 is obtained by averaging original signals G1 and G3; an interpolation signal GHV is obtained by averaging original signals G1, G2, G3 and G4; an interpolation signal GV2 is obtained by averaging original signals G2 and G4; and an interpolation signal GH2 is obtained by averaging original signals G3 and G4, respectively. While G, i.e., the green component video signal is interpolated as described above, it is needless to say that the red and blue component video signals are interpolated similarly.

The interpolation processing of the green (G) component video signal, for example, is expressed by the following equation (1):

$$GH1 = \tfrac{1}{2}(G1+G2)$$
$$GV1 = \tfrac{1}{2}(G1+G3)$$
$$GHV = \tfrac{1}{4}(G1=G2+G2+G4) \quad (1)$$

The interpolation processing of red (R) and blue (B) component video signals is similar to that of the equation (1) and expressed by the following equations (2) and (3):

$$RH1 = \tfrac{1}{2}(R1+R2)$$
$$RV1 = \tfrac{1}{2}(R1+R3)$$
$$RHV = \tfrac{1}{4}(R1+R2+R3+R4) \quad (2)$$
$$BH1 = \tfrac{1}{2}(B1+B3)$$
$$BHV = \tfrac{1}{4}(B1+B2+B3+B4) \quad (3)$$

The interpolation signals (R, G and B) that were obtained by the above-mentioned interpolation processing are supplied to a color processing circuit 15, a luminance low band processing circuit 18 and the luminance high band processing circuit 19.

The color processing circuit 15 generates color difference signals R−YL and B−YL on the basis of the interpolation signals from the interpolation circuits 12, 13, 14 and a low band luminance signal YL which will be described later on. The color difference signals R−YL and B−YL from the color processing circuit 15 are supplied through output terminals 16, 17 to other circuits of, for example, a video camera (not shown) or the like.

The luminance low band processing circuit 18 generates the low band luminance signal YL on the basis of the interpolation signals from the interpolation circuits 12, 13 and 14. The low band luminance signal YL is generated by mixing R, G and B in such a fashion that a ratio of R, G and B components, for example, becomes such one as expressed by the following equation (4):

$$YL \text{ (low band luminance signal)} = 0.59G \text{ (green)} + 0.3R \text{ (red)} + 0.1B \text{ (blue)} \quad (4)$$

However, since the interpolation signals generated by the interpolation circuits 12, 13, 14 are used when the low band luminance signal YL is generated, a resolution cannot be improved.

Figure 4:
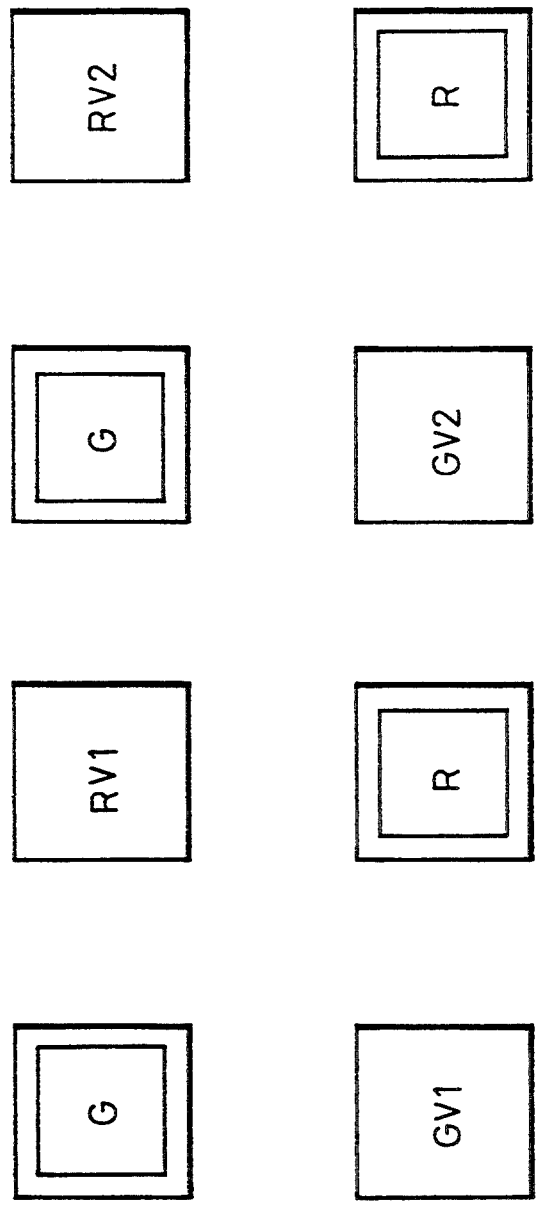
FIG. 4 is a schematic diagram used to explain a processing for improving a resolution.

Therefore, the luminance high band processing circuit 19 carries out the processing in order to improve a resolution as shown in FIG. 4.

In FIG. 4, of open squares having open square centers, an open square having an open square center "G" represents a green (G) original signal, and an open square having an open square center "R" represents a red (R) original signal. Of other squares, an open square having "GV1" represents the interpolation signal that is obtained by averaging the green (G) original signals G1 and G3, as earlier noted in connection with FIG. 3. An open square having "GV2" represents the interpolation signal that is obtained by averaging the green (G) original signals G2 and G4, as earlier noted. An open square having "RV1" represents the interpolation signal that is obtained by averaging the red (R) original signals R1 and R3, as earlier noted. An open square having "RV2" represents the interpolation signal that is obtained by averaging the red (R) original signals R2 and R4, as earlier noted in connection with FIG. 3. When the blue (B) interpolation signal is used instead of the red (R) interpolation signal, if FIG. 3 is made corresponding to FIG. 4, "RV1" becomes "BV1", and "BV1" is the interpolation signal that is obtained by averaging blue (B) original signals B1 and B3, as is clear from FIG. 3. "RV2" becomes "BV2", and "BV2" is the interpolation signal that is obtained by averaging blue (B) original signals B2 and B4, as is clear from FIG. 3.

More specifically, in the luminance high band processing circuit 19, as shown in FIG. 4, the green (G) original signals and red (R) interpolation signals RV1, RV2, ..., RVn that are obtained only by the vertical interpolation are alternately arranged on an n'th line, for example. Also, the red (R) original signals and green (G) interpolation signals GV1, GV2, ..., GVn that are obtained only by the vertical interpolation are alternately arranged on an (n+1)'th line. With this arrangement, a high band luminance signal YH is obtained on the basis of the following equation (5):

$$YH \text{ (high band luminance signal)} = 0.5G \text{ (green)} + 0.5R \text{ (red)} \quad (5)$$

When the blue (B) interpolation signal is used, the green (G) original signals and blue (B) interpolation signals BV1, BV2, ..., BVn that are obtained only by the vertical interpolation are alternately arranged on the n'th line, for example. Also, the blue (B) original signals and green (G) interpolation signals GV1, GV2, ..., GVn that are obtained only by the vertical interpolation are alternately arranged on the (n+1)'th line. With this arrangement, the high band luminance signal YH is obtained on the basis of the following equation (6):

$$YH \text{ (high band luminance signal)} = 0.5G \text{ (green)} + 0.5B \text{ (blue)} \quad (6)$$

Incidentally, the high band luminance signal YH may be obtained by using the following equation (7):

$$YH \text{ (high band luminance signal)} = 0.5G \text{ (green)} + 0.25R \text{ (red)} + 0.25B \text{ (blue)} \quad (7)$$

As arrangement for obtaining the high band luminance signal YH on the basis of the above-mentioned equation (7), such an arrangement may be considered that the green (G) original signals, and signals which result from averaging the red (R) interpolation signals RV1, RV2, ..., RVn that are obtained only by the vertical interpolation and blue (B) interpolation signals BV1, BV2, ..., BVn that are obtained only by the vertical interpolation, i.e., RV1+BV1/2, RV2+BV2/2, ..., RVn+BVn/2 may be alternately arranged on the n'th line, and that signals which result from averaging the red (R) original and the blue (B) original signal, and green (G) interpolation signals GV1, GV2, ..., GVn that are obtained only by the vertical interpolation may be alternately arranged on the (n+1)'th line.

Furthermore, the arrangement that can obtain the high band luminance signal YH may be realized by the following method. That is, signals which result from averaging red (R) upper and lower original signals and blue (B) upper and lower original signals, i.e., (R+R+B+B)/4 and the green (G) original signals may be arranged alternately.

Referring back to FIG. 1, the high band luminance signal YH and the low band luminance signal YL that were obtained by the above-mentioned signal processing are supplied to a luminance processing circuit 20. The luminance processing circuit 20 generates a luminance signal Y on the basis of the low band luminance signal YL from the luminance low band processing circuit 18 and the high band luminance signal YH from the luminance high band processing circuit 19. The processing carried out by the luminance signal processing circuit 2- will be described with reference to FIG. 5.

Figure 5:
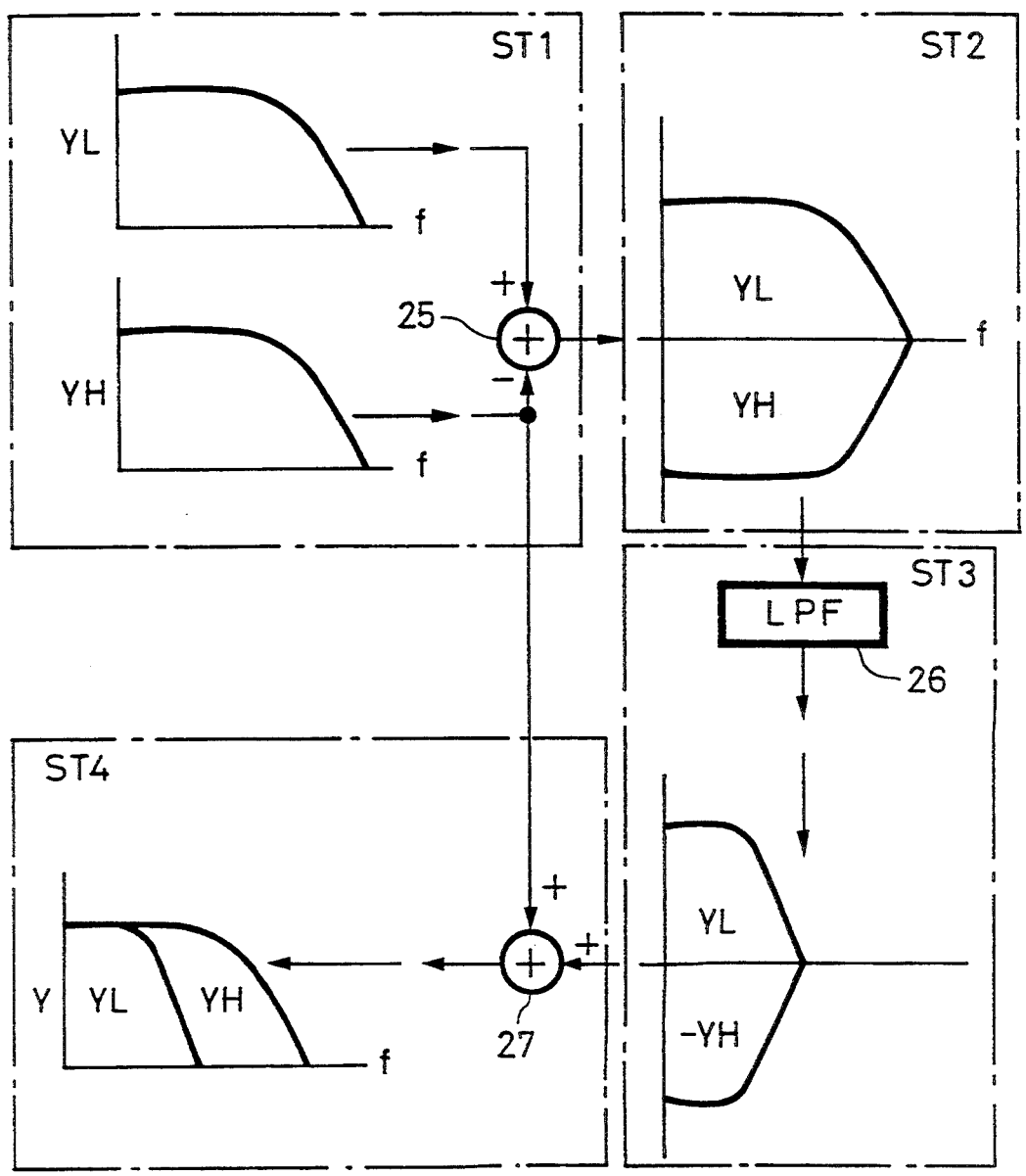
FIG. 5 is a schematic diagram used to explain a processing done by a luminance processing circuit used in the present invention.

As shown in FIG. 5, the luminance processing circuit 20 includes at least adding circuits 25, 27 and a low-pass filter (LPF) 26.

As shown in FIG. 5, initially, in step ST1, the high band luminance signal YH is subtracted from the low band luminance signal YL by the adding circuit 25 and an added output from the adding circuit 25 becomes as shown at step ST2.

The added output from the adding circuit 25 as shown at step ST2 is supplied to the low-pass filter 26 as shown at step ST3 and its low band component is passed therethrough as shown at step ST3.

Subsequently, in step ST4, the low band filtered-out output obtained at step ST3 and the high band luminance signal YH input at step ST1 are added by the adding circuit 27, whereby the low band portion of the input high band luminance signal YH shown at step ST1 and the low band portion of the high band luminance signal −YH shown at step ST3 are canceled each other out. Therefore, there is obtained the luminance signal Y in which the low band portion of the low band luminance signal YL and the high band portion of the high band luminance signal YH are mixed as shown at step ST4.

Then, this luminance signal Y is supplied through an output terminal 21 to other circuits of the video camera (not shown) or the like, as shown in FIG. 1.

When a color video signal formed of the color difference signals R−Y, B−Y output from the output terminals 16, 17 and the luminance signal Y output from the output terminal 21 (see FIG. 1) is supplied to a monitor or the like, for example, and displayed on the picture screen of such monitor as an image, the number of pixels in the horizontal direction becomes equivalent to twice the number of pixels regardless of the CCD devices whose number of pixels is the same as that of the conventional CCDs. Therefore, a resolution can be doubled.

Since the video signal is formed of original signals and vertical interpolation signals of the original signals in the vertical direction, the number of pixels is not doubled equivalently but a resolution can be improved. Incidentally, if the above-mentioned low-pass filter is replaced with a two-dimensional filter, the original signal and the horizontal interpolation signal can be used in the vertical direction, thereby achieving similar effects to those achieved in the horizontal direction.

As described above, according to this embodiment, the video signal is obtained by using the red (R) CCD device 3 and the blue (B) CCD device 5 disposed at positions displaced by ½ pitch in the vertical and horizontal directions, i.e., obliquely displaced relative to the spatial position of the green (G) CCD device 4. The signal from the green (G) CCD device 4 and of the interpolation signals of the video signals from the red (R) and blue (B) CCD devices 3, 5, the vertical interpolation signal are used to generate the high band luminance signal YH, and the high band luminance signal YH is obtained by using 0.5G (green)+0.5R (red), 0.5G (green)+0.5B (blue), 0.5G (green)+0.25R (red)+0.25B (blue) or the like as a mixing ration required when the high band luminance signal YH is generated. On the other hand, the low band luminance signal YL is generated by using 0.59G (green)+0.3R (red)+0.11B (blue). Further, the luminance processing circuit 20 generates the luminance signal Y formed of the low band portion of the low band luminance signal YL and the high band portion of the high band luminance signal YH. Therefore, the video signal that is equivalent to the video signal obtained by using the CCD device whose number of pixels is doubled in the horizontal direction can be obtained by using the CCD device whose number of pixels is the same as that of the conventional CCD device. Consequently, the video camera can be miniaturized and reduced in weight. A video signal of resolution twice or more of the conventional resolution can be obtained by using the CCD device whose number of pixels is at least the same without increasing the physical number of pixels.

As is clear from the above description, since the number of pixels of the CCD device is not increased, it is possible to remove the disadvantages caused when the number of pixels in the CCD device is increased, such as the increase of power consumption, a deterioration of yield or the like.

According to the present invention, since the output signals from the first CCD device and the second CCD device disposed at the position obliquely displaced relative to the spatial position of the first CCD device are interpolated by the interpolating means, the low band luminance signal generating means generates the low band luminance signal on the basis of the output from the interpolating means, the high band luminance signal generating means generates the high band luminance signal on the basis of the output signals from the first and second CCD devices and the interpolation signal from the interpolation means and the luminance signal generating means generates the luminance signal on the basis of the low band luminance signal and the high band luminance signal from the low band luminance signal generating means and the high band luminance signal generating means, the video camera can be miniaturized and reduced in weight. Also, a video signal of resolution twice or more of the conventional resolution can be obtained by using the CCD device whose number of pixels is at least the same without increasing the physical number of pixels.

According to the present invention, since the low band luminance signal generating means generates the low band luminance signal by the calculation of 0.59G (green)+0.3R (red)+0.11B (blue), a satisfactory low band luminance signal can be obtained in addition to the aforesaid effects.

Further, according to the present invention, since the high band luminance signal generating means generates the high band luminance signal by a calculation of 0.5G (green)+0.5R (red), in addition to the aforesaid effects, the video signal that is equivalent to the video signal obtained by using the CCD device whose number of pixels is substantially doubled in the horizontal direction can be obtained, and a doubled resolution can be obtained in the vertical direction.

Further, according to the present invention, since the high band luminance signal generating means generates the high band luminance signal by a calculation of 0.5G (green)+0.5B (blue), in addition to the aforesaid effects, the video signal that is equivalent to the video signal obtained by using the CCD device whose number of pixels is substantially doubled in the horizontal direction and can be obtained satisfactorily, and a doubled resolution can be obtained in the vertical direction.

Furthermore, according to the present invention, since the high band luminance signal generating means generates the high band luminance signal by a calculation of 0.5G (green)+0.25R (red)+0.25B (blue), in addition to the aforesaid effects, the video signal that is equivalent to the video signal obtained by using the CCD device whose number of pixels is substantially doubled in the horizontal direction and can be obtained satisfactorily, and a doubled resolution can be obtained in the vertical direction.

Furthermore, according to the present invention, since the luminance signal generating means generates the interpolated pixel signal of the first CCD device by the addition of original signals corresponding to n pixels of the second CCD device and by multiplying the added result with 1/n, in addition to the aforesaid effects, the satisfactory video signal which is equivalent to the video signal obtained by using the CCD device whose number of pixels is substantially doubled in the horizontal direction can be obtained and the doubled resolution in the vertical direction can be obtained.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A luminance signal generating apparatus comprising:
   a first CCD device;
   a second CCD device disposed at a position obliquely displaced relative to a spatial position of said first CCD device;
   interpolating means for interpolating the output from said second CCD device;
   low band luminance signal generating means for generating a low band luminance signal on the basis of the output from said interpolating means;

high band luminance signal generating means for generating a high band luminance signal on the basis of output signals from said first and second CCD devices and the interpolation signal from said interpolating means; and luminance signal generating means for generating a luminance signal on the basis of said low band luminance signal and said high band luminance signal from said low band luminance signal generating means and said high band luminance generating means.

2. A luminance signal generating apparatus according to claim 1, wherein said low band luminance signal generated from said low band luminance signal generating means is obtained by a calculation of 0.59G (green)+0.3R (red)+0.11B (blue).

3. A luminance signal generating apparatus according to claim 1, wherein said high band luminance signal generated from said high band luminance signal generating means is obtained by a calculation of 0.5G (green)+0.5R (red).

4. A luminance signal generating apparatus according to claim 1, wherein said high band luminance signal generated from said high band luminance signal generating means is obtained by a calculation of 0.5G (green)+0.5B (blue).

5. A luminance signal generating apparatus according to claim 1, wherein said high band luminance signal generated from said high band luminance signal generating means is obtained by a calculation of 0.5G (green)+0.25R (red)+0.25B (blue).

6. A luminance signal generating apparatus according to claim 1, wherein said luminance signal generating means receives said output from at least said first CCD device and further comprises:

means for interpolating the output from said first CCD device including means for adding original signals, corresponding to n pixels in the output from the second CCD device, to the output from the first CCD device to produce an addition output signal representative thereof, and means for multiplying said addition output signal by 1/n, where n is an integer greater than zero, and providing an output signal representative thereof; whereby resolution in horizontal and vertical directions is at least substantially doubled.

7. A luminance signal generating apparatus comprising:

first and second CCD devices;

a third CCD device disposed at a position displaced by a ½ pixel in the horizontal and vertical directions relative to spatial positions of said first and second CCD devices;

interpolating means for interpolating the output signal from said third CCD device;

low band luminance signal generating means for generating a low band luminance signal on the basis of the output signal from said interpolating means;

high band luminance signal generating means for generating a high band luminance signal on the basis of output signals from said second and third CCD devices and the interpolation signal from said interpolating means; and luminance signal generating means for generating a luminance signal on the basis of said low band luminance signal and said high band luminance signal from said low band luminance signal generating means and said high band luminance signal generating means.

* * * * *